United States Patent [19]

Hoyss et al.

[11] Patent Number: 4,594,035

[45] Date of Patent: Jun. 10, 1986

[54] DRILLING STAND

[75] Inventors: Franz Hoyss, Bad Tölz; Rudolf Reitberger, Munich, both of Fed. Rep. of Germany

[73] Assignee: Hilti Aktiengesellschaft, Fürstentum, Liechtenstein

[21] Appl. No.: 653,969

[22] Filed: Sep. 24, 1984

[30] Foreign Application Priority Data

Sep. 26, 1983 [DE] Fed. Rep. of Germany ....... 3334753

[51] Int. Cl.[4] .............................................. B23B 39/00

[52] U.S. Cl. .................................. 408/234; 29/26 R; 408/129; 408/238; 408/712

[58] Field of Search .................... 408/712, 241 G, 234, 408/129, 135, 137, 116, 131, 136, 241 R, 238; 409/235, 236, 241; 29/26 R, 26 B

[56] References Cited

U.S. PATENT DOCUMENTS

| | | | |
|---|---|---|---|
| 1,395,194 | 10/1921 | Lindhe | 408/137 X |
| 1,922,532 | 8/1933 | Ehlen | 408/712 X |
| 2,887,911 | 5/1959 | Bunting | 408/135 X |
| 2,932,914 | 4/1960 | Buck | 408/234 X |
| 3,234,977 | 2/1966 | Byers | 408/712 X |
| 3,387,509 | 6/1968 | Lupean | 408/234 X |
| 3,890,058 | 6/1975 | Self et al. | 408/712 X |
| 4,011,024 | 3/1977 | Nakano et al. | 408/712 X |
| 4,057,358 | 11/1977 | Young | 408/712 X |
| 4,393,627 | 7/1983 | Ailey, Jr. | 408/137 X |
| 4,500,235 | 2/1985 | Johnsen | 408/238 |
| 4,541,759 | 9/1985 | Miyoshi | 408/712 X |

*Primary Examiner*—Gil Weidenfeld
*Assistant Examiner*—Glenn L. Webb
*Attorney, Agent, or Firm*—Toren, McGeady, Stanger, Goldberg & Kiel

[57] ABSTRACT

A drilling stand has an axially extending guide column with a U- or C-shaped transverse cross-section forming an interior space in which a carriage is guided for movement in the axial direction. A drilling unit is mounted on the carriage and includes a drive member supported on the carriage within the interior space and a receiving part forming a holder for a drilling tool, connected to the drive member and projecting laterally outwardly from the guide column.

10 Claims, 2 Drawing Figures

DRILLING STAND

SUMMARY OF THE INVENTION

The present invention is directed to a drilling stand including a guide column, and a carriage for supporting a drilling unit mounted on the carriage. The drilling unit consists of a drive member and a receiving part connected to it for holding a drilling tool. The carriage is axially displaceably supported within the guide column and a device is mounted on the guide column in engagement with the carriage for moving the carriage within the column.

In a known drilling stand, an H-shaped guide column is supported by a base on the material to be drilled. A carriage is supported on a flange on the guide column and the carriage is displaceable along the guide column and supports a drilling unit. The drilling unit is made up of a drive member including a motor and a receiving part for a drilling tool with the receiving part being substantially coaxial with the drive member. A device is engageable with the carriage and serves to move the carriage and the drilling unit along the guide column.

The outward projection of the entire drilling unit from the guide column has considerable disadvantages as does the known bearing for the carriage. Due to this arrangement, it is not possible to drill close to corners, since the drilling unit with the largest diameter is determined by the design and it cannot be made smaller so that it is not possible to drill at a location close to a wall. Further, the outward projection of the drilling device leads to considerable bending stress in the guide column and, further, there is a heavy load acting on the carriage bearing. Moreover, the outwardly projecting arrangement of the drilling unit also causes problems with respect to the stability under load of the drilling stand mounted on the material to be drilled.

Therefore, it is the primary object of the present invention to provide a drilling stand which is distinguished by its excellent accessibility to corners as well as balanced loads acting on the guide column and bearings.

In accordance with the present invention, the guide column is formed with a substantially U-shaped or C-shaped transverse cross-section. The inner wall of the shaped guide column forms guides for the carriage and the drilling unit. Further, the drilling unit is mounted on the carriage so that only the part which receives the drilling tool projects outwardly from the guide column cross-section.

Based on the present invention, the carriage is supported within the interior space defined by the shaped guide column and the drive member of the drilling unit is mounted within the interior space. The receiving part of the drilling unit which projects laterally outwardly from the guide column has a substantially smaller diameter than the drive member so that the drilling axis can be moved much closer to walls extending vertically upwardly from the surface to be drilled than is possible with the known arrangement. The drilling stand of the present invention affords a well balanced distribution of the load to the guides formed by the inner wall surface of the guide column, and the possibility of jamming during movement of the carriage is minimized.

Preferably four guides are distributed in spaced relation around the circumference of the inner wall surface of the guide column. With this arrangement a symmetrical division of the load can be obtained and it is advisable to arrange the guide surfaces as uniformly as possible around the inner wall surface.

An advantageous feature of the invention is the formation of the guides in the inner wall surface of the guide column as grooves or channels having a flat or planar base surface with the grooves or channels serving to guide elements formed on the carriage. By forming the guides in the guide column with flat surfaces, it is possible to produce the guides in a simple manner and, in addition, to afford a distribution of the load with low specific load values while employing simple and inexpensive guide elements.

In one embodiment, rollers or similar members can be used as the guide elements on the carriage. With respect to low specific load values at the bearings, the guide elements on the carriage are preferably formed as sliding strips or surfaces. When the sliding surfaces are formed of a self-lubricating material, no maintenance is necessary.

The guide column can be supported on the material to be drilled by a base connected securely to the guide column, as well as by a clampable holding device which can be formed of several braces of modular construction.

Another significant feature of the invention is the provision on the outside of the guide column of an axially extending groove with undercut side surfaces. With this arrangement a reliable, form-locking connection can be easily achieved using such a groove with a dove-tail section, where the holding device has a clamping section engageable within the groove. Preferably, the clamping section can be secured in various pivotal positions relative to the holding device so that the guide column can be used in different positions and the drilling direction can be freely selected. Furthermore, the distribution of weight provided by arranging the drive member in the interior of the guide column is advantageous in the various use positions of the drilling stand.

Another feature of the present invention is the use of a protective shield between the base of the guide column and the drive member for protecting the drive member from any drilling water used at the drilling site. The protective shield is supported so that it is displaceable relative to the guide column and forms a closure of the open space located within the shaped guide column. With such a protective shield it is possible to eliminate any spray from impinging on the drive member, especially when the drilling direction is performed vertically upwardly. Accordingly, the drive member is protected laterally to a great degree by the laterally enclosing wall member forming the guide column so that at the drilling site the drilling unit is protected against any impairment caused by spraying water.

Advantageously, the protective shield is connected with the receiving part so that a separate guide and advancing means for the protective shield can be dispensed with.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
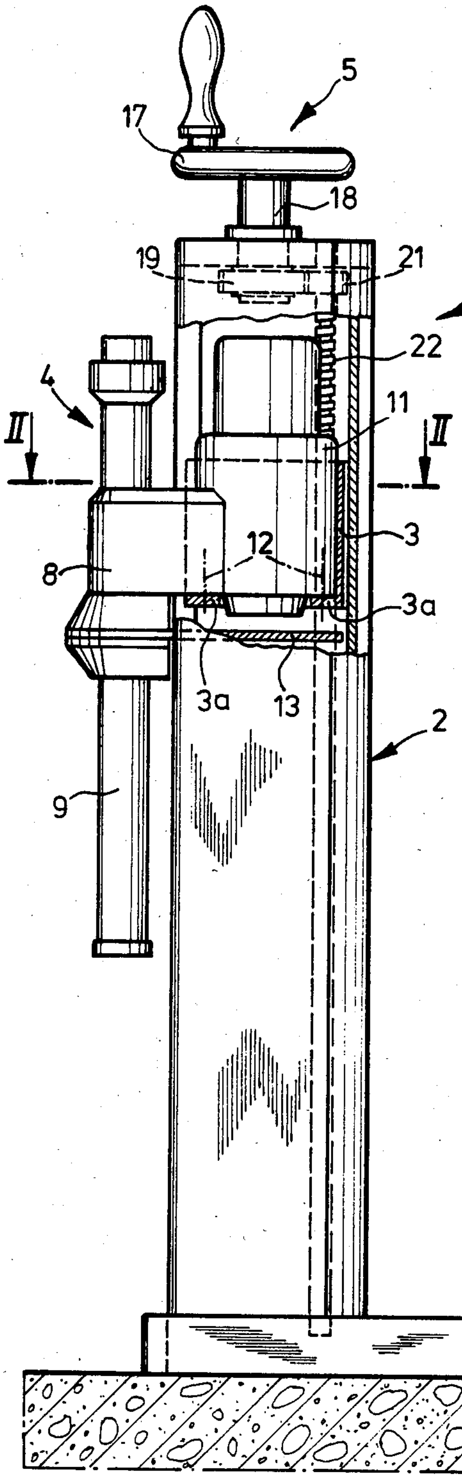
FIG. 1 is an elevational view, partly in section, of a drilling stand embodying the present invention.

A drilling stand 1 is illustrated in FIG. 1 and has an axially extending guide column 2 containing a carriage 3 which is movably supported within the column. A drilling unit 4 is supported on the carriage 3. A device 5 is located within the column for moving the carriage 3 and the drilling unit 4 in the axial direction of the column.

The lower end of the guide column 2 is connected to and supported on a base 6 so that the drilling stand is supported securely on the surface of a material 7 to be drilled. The base may also be formed as a vacuum plate. While the drilling stand 1 is shown supported on a horizontal surface with the column extending upwardly from the support surface, it would be possible to orient the drilling stand obliquely of the horizontal or vertical.

The drilling unit 4 includes a receiving part 8 projecting outwardly from the outer surface of the guide column and serves to hold a drilling tool 9. The drilling unit also includes a drive member 11 containing a drive motor and a gear unit located within the guide column 2. The drive member is secured in the carriage 3 to a bottom ring *3a* by connecting members 12 shown schematically in FIG. 1. Further, a protective shield 13 is located within the guide column 2 below the carriage 3 and the shield extends outwardly from the space within the guide column and is connected to the receiving part 8. The protective shield 13 protects the drive member 11.

Figure 2:
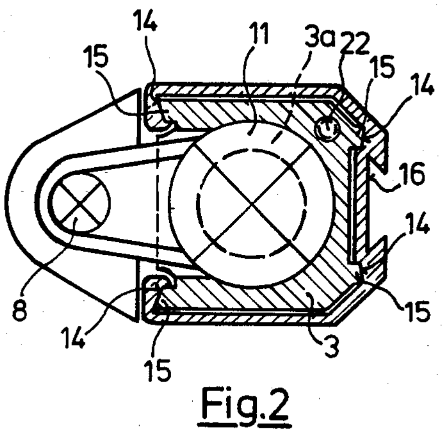
FIG. 2 is a sectional view taken along the line II—II in FIG. 1.

As shown in FIG. 2, in transverse section the guide column has an approximately C-shape. It can be appreciated that it would also be possible to afford a U-shaped cross-section. As a result of the C-shaped cross-section, a vertically extending slot is formed in one side of the column so that the receiving part projects outwardly from the drive member 2 and is located outwardly from the outside surface of the guide column. Four guides 14 are formed in the inner wall surface of the guide column due to the illustrated shaped configuration. The guides 14 have a flat or planar base and are located on the corners of the generally rectangular shaped inner space within the guide column. The carriage 3 has complementary shaped guide elements 15 which fit in sliding engagement within the guide grooves 14 so that the movement of the carriage in the axial direction of the guide column 2 is provided by the guides 14. The guide elements 15 can be constructed so that they are adjustable.

On the opposite side of the guide column from the slot through which the receiving part projects, a longitudinally extending dove-tail groove 16 extends in the axial direction of the guide column and permits the connection between the drilling stand 1 and a holding device, not shown.

As viewed in FIG. 1, a device 5 is provided at the upper end of the guide column and includes a hand wheel 17 for operating the device which effects the movement of the carriage 3. The hand wheel 17 is connected by a shaft 18 to a driving gear wheel 19 so that the wheel 19 rotates with the hand wheel 17. The gear wheel 19 is in meshed engagement with another gear wheel 21 fixed to a rotatable spindle 22 so that the gear wheel 21 rotates with the spindle. The spindle 22 extends downwardly in the axial direction of the guide column from the gear wheel 21 and is in threaded engagement with the carriage 3, note FIG. 2. By turning the hand wheel 17 the driving gear wheel 19 is rotated and in turn drives the gear wheel 21 and the rotatable spindle 22. The threaded engagement between the spindle 22 and the carriage 3 causes the carriage to move upwardly or downwardly, as desired, within the guide column 2. As can be seen in FIG. 2 the spindle 22 is positioned within the carriage 3 located on the opposite side of the drive member 11 from the slot formed by the C-shaped guide column.

While specific embodiments of the invention have been shown and described in detail to illustrate the application of the inventive principles, it will be understood that the invention may be embodied otherwise without departing from such principles.

We claim:

1. Drilling stand comprising axially extending guide column, a drilling unit including a drive member and a receiving part connected to said drive member and said receiving part arranged to receive a drilling tool, a carriage supported on said guide column, said drilling unit mounted on said carriage so that said drilling unit can be moved in the axial direction of said guide column, and means for moving said carriage on said guide column, wherein the improvement comprises that said guide column comprises an axially extending shaped wall member defining an interior space and an axially elongated slot in communication with the interior space and the exterior of said wall member, said wall member forming a plurality of axially extending guides opening to the interior space, said carriage located within the interior space and in sliding contact with said guides, said drive member located within said interior space and supported on said carriage, said receiving part extending outwardly from said drive member through said slot and projecting outwardly from the exterior of said wall member, and said shaped wall member is U-shaped transverse to the axial direction of said guide column.

2. Drilling stand comprising an axially extending guide column, a drilling unit including a drive member and a receiving part connected to said drive member and said receiving part arranged to receive a drilling tool, a carriage supported on said guide column, said drilling unit mounted on said carriage so that said drilling unit can be moved in the axial direction of said guide column, and means for moving said carriage on said guide column, wherein the improvement comprises that said guide column comprises an axially extending shaped wall member defining an interior space and an axially elongated slot in communication with the interior space and the exterior of said wall member, said wall member forming a plurality of axially extending guides opening to the interior space, said carriage located within the interior space and in sliding contact with said guides, said drive member located within said interior space and supported on said carriage, said receiving part extending outwardly from said drive member through said slot and projecting outwardly from the exterior of said wall member, and said shaped wall member is C-shaped transverse to the axial direction of said guide column.

3. Drilling stand, as set forth in claim 1 or 2 wherein four said guides are formed in the inside surface of said wall member spaced apart around the circumference of the inner wall surface.

4. Drilling stand, as set forth in claim 3, wherein said guides are formed as grooves in the inner surface of said wall member with said grooves extending in the axial direction of said guide column and said grooves having a planar base surface, and said carriage having guide elements formed thereon extending in the axial direction of said guide column and being complementary to said grooves with said guide elements disposed in sliding contact within said grooves.

5. Drilling stand, as set forth in claim 4, wherein said guide elements are formed as outward projections from said carriage.

6. Drilling stand, as set forth in claim 1 or 2 wherein said wall member has an outside wall surface and a longitudinally extending groove formed in said outside wall surface of said wall member on the opposite side thereof from said slot through which said receiving part extends, and said exterior groove having a base surface and side surfaces disposed in spaced relation and said side surfaces being undercut.

7. Drilling stand, as set forth in claim 1 or 2 wherein said guide column has an upper end and a lower end, a base member mounting the lower end of said guide column, a protective shield extending transversely across the interior space of said guide column and located between said carriage and said base member and said protective shield is connected to said drilling unit for displacement with said drilling unit relative to said guide column.

8. Drilling stand, as set forth in claim 7, wherein said protective shield is connected to said receiving part at a location spaced below said carriage.

9. Drilling stand, as set forth in claim 1 or 2, wherein said means for moving said carriage comprises a spindle located within said guide column in generally parallel relation with the axis thereof and disposed in threaded engagement with said carriage, a first gear wheel fixed to said spindle, a second gear wheel in meshed engagement with said first gear wheel, a hand actuated member attached to said second gear wheel so that by rotating said second gear wheel said first gear wheel and said spindle are rotated for axially displacing said carriage within the interior space in said guide column.

10. Drilling stand, as set forth in claim 1 or 2, wherein said receiving part is arranged to hold a drilling tool in generally parallel relation to the axis of said guide column with the drilling tool spaced laterally outwardly from the exterior surface of said guide column.

* * * * *